(12) United States Patent
Kawase et al.

(10) Patent No.: US 10,305,685 B2
(45) Date of Patent: May 28, 2019

(54) COMMUNICATIONS SYSTEM AND COMMUNICATIONS METHOD

(71) Applicants: Tsutomu Kawase, Kanagawa (JP); Masahiko Itoh, Kanagawa (JP); Fumihiko Itoh, Kanagawa (JP); Tadanori Ryu, Kanagawa (JP); Kei Inaba, Kanagawa (JP)

(72) Inventors: Tsutomu Kawase, Kanagawa (JP); Masahiko Itoh, Kanagawa (JP); Fumihiko Itoh, Kanagawa (JP); Tadanori Ryu, Kanagawa (JP); Kei Inaba, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 293 days.

(21) Appl. No.: 15/213,587

(22) Filed: Jul. 19, 2016

(65) Prior Publication Data

US 2017/0099135 A1    Apr. 6, 2017

Related U.S. Application Data

(63) Continuation of application No. PCT/JP2015/052067, filed on Jan. 26, 2015.

(30) Foreign Application Priority Data

Jan. 28, 2014  (JP) .................. 2014-012896

(51) Int. Cl.
*H04L 9/08*  (2006.01)
*H04L 9/16*  (2006.01)
(Continued)

(52) U.S. Cl.
CPC .............. *H04L 9/083* (2013.01); *G06F 21/35* (2013.01); *G06F 21/6245* (2013.01);
(Continued)

(58) Field of Classification Search
CPC ......... H04L 9/083; H04L 9/0861; H04L 9/32; H04L 9/16; H04L 63/0428; H04L 9/0891; G06F 21/6245; G06F 21/35
(Continued)

(56) References Cited

U.S. PATENT DOCUMENTS 7,024,553 B1   4/2006   Morimoto
7,492,258 B1   2/2009   Shoarinejad et al.
(Continued)

FOREIGN PATENT DOCUMENTS

JP    2001-111543    4/2001
JP    2004-317764    11/2004
(Continued)

OTHER PUBLICATIONS

Juels, A., "RFID Security and Privacy: A Research Survey", IEEE Journal on Selected Areas in Communications, vol. 24, Issue 2, Feb. 2006, pp. 381 to 394.
(Continued)

*Primary Examiner* — Kambiz Zand
*Assistant Examiner* — Benjamin A Kaplan
(74) *Attorney, Agent, or Firm* — Oblon, McClelland, Maier & Neustadt, L.L.P.

(57) ABSTRACT

An identification information transmitter encrypts identification information for identifying a person or an object using an encryption key, transmits the encrypted identification information, and, after receiving another encryption key, switches the encryption key from the encryption key to the other encryption key. A server receives the encrypted identification information from the identification information transmitter, determines whether the encryption key is to be switched, and, if the encryption key is to be switched, generates the other encryption key. Another server authenticates the identification information that an identification
(Continued)

information receiver receives from the identification information transmitter, and, if authentication is successful, acquires the other encryption key from the server, and transmits the other encryption key to the identification information receiver. The identification information receiver, when receiving the other encryption key from the second server, transmits the other encryption key to the identification information transmitter.

14 Claims, 6 Drawing Sheets

(51) Int. Cl.
    *H04L 9/32* (2006.01)
    *G06F 21/35* (2013.01)
    *G06F 21/62* (2013.01)
    *H04L 29/06* (2006.01)

(52) U.S. Cl.
    CPC .......... *H04L 9/0861* (2013.01); *H04L 9/0891* (2013.01); *H04L 9/16* (2013.01); *H04L 9/32* (2013.01); *H04L 63/0428* (2013.01)

(58) Field of Classification Search
    USPC ........................................................ 713/168
    See application file for complete search history.

(56) References Cited

U.S. PATENT DOCUMENTS

| | | | |
|---|---|---|---|
| 7,991,774 B2 | 8/2011 | Takatsu et al. | |
| 2005/0088284 A1* | 4/2005 | Zai | G06K 7/0008 340/10.2 |
| 2005/0134461 A1* | 6/2005 | Gelbman | G06K 7/10079 340/572.8 |
| 2005/0198228 A1* | 9/2005 | Bajwa | H04L 12/4633 709/220 |
| 2006/0032901 A1* | 2/2006 | Sugiyama | G07C 9/00103 235/375 |
| 2008/0157927 A1 | 7/2008 | Soppera et al. | |
| 2009/0282249 A1 | 11/2009 | Aamknecht et al. | |
| 2010/0155475 A1 | 6/2010 | Paek et al. | |
| 2011/0091038 A1 | 4/2011 | Thueringer | |

FOREIGN PATENT DOCUMENTS

| | | |
|---|---|---|
| JP | 2004-362201 | 12/2004 |
| JP | 2005-167670 | 6/2005 |
| JP | 2006-253967 | 9/2006 |
| JP | 2008-250676 | 10/2008 |
| JP | 2011-060046 | 3/2011 |
| JP | 4779736 | 9/2011 |
| JP | 2013-042266 | 2/2013 |
| WO | 2007/144090 | 12/2007 |
| WO | 2009/147545 | 12/2009 |

OTHER PUBLICATIONS

International Search Report dated Feb. 24, 2015 in PCT/JP2015/052067 filed on Jan. 26, 2015 ( with English Translation).
Written Opinion dated Feb. 24, 2015 in PCT/JP2015/052067, filed on Jan. 26, 2015.
Extended European Search Report dated Nov. 3, 2016 in Patent Application No. 15742989.5.

* cited by examiner

COMMUNICATIONS SYSTEM AND COMMUNICATIONS METHOD

CROSS-REFERENCE TO RELATED APPLICATIONS

The present application is a continuation application of International Application No. PCT/JP2015/052067, filed Jan. 26, 2015, which claims priority to Japanese Patent Application No. 2014-012896, filed Jan. 28, 2014. The contents of these applications are incorporated herein by reference in their entirety.

BACKGROUND OF THE INVENTION

1. Field of the Invention

The present disclosure relates to a communications system and a communications method.

2. Description of the Related Art

An authentication system which includes a wireless tag that encrypts identification information (which may be simply referred to as an "ID", hereinafter), and transmits the encrypted ID has been known (for example, see Japanese Patent No. 4779736).

SUMMARY

A communications system includes an identification information transmitter configured to encrypt identification information for identifying one of a person and an object using an encryption key, transmit the encrypted identification information, and, after receiving another encryption key, switch the encryption key from the encryption key to the other encryption key, a first server configured to receive the encrypted identification information from the identification information transmitter, determine whether the encryption key is to be switched, and, if the encryption key is to be switched, generate the other encryption key, a second server configured to authenticate the identification information that an identification information receiver receives from the identification information transmitter, and, if authentication is successful, acquire the other encryption key from the first server and transmit the other encryption key to the identification information receiver, and the identification information receiver is configured to, when receiving the other encryption key from the second server, transmit the other encryption key to the identification information transmitter.

Other objects, features, and advantages will become more apparent from the following detailed description when read in conjunction with the accompanying drawings.

DESCRIPTION OF THE EMBODIMENTS

Below, an embodiment of the present invention will be described with reference to FIGS. 1-6.

An object of the embodiment is to provide a communications system capable of preventing a location of a person who has an identification information transmitter with him or her and an object equipped with the identification information transmitter from being continuously identified by a third person.

Figure 1:
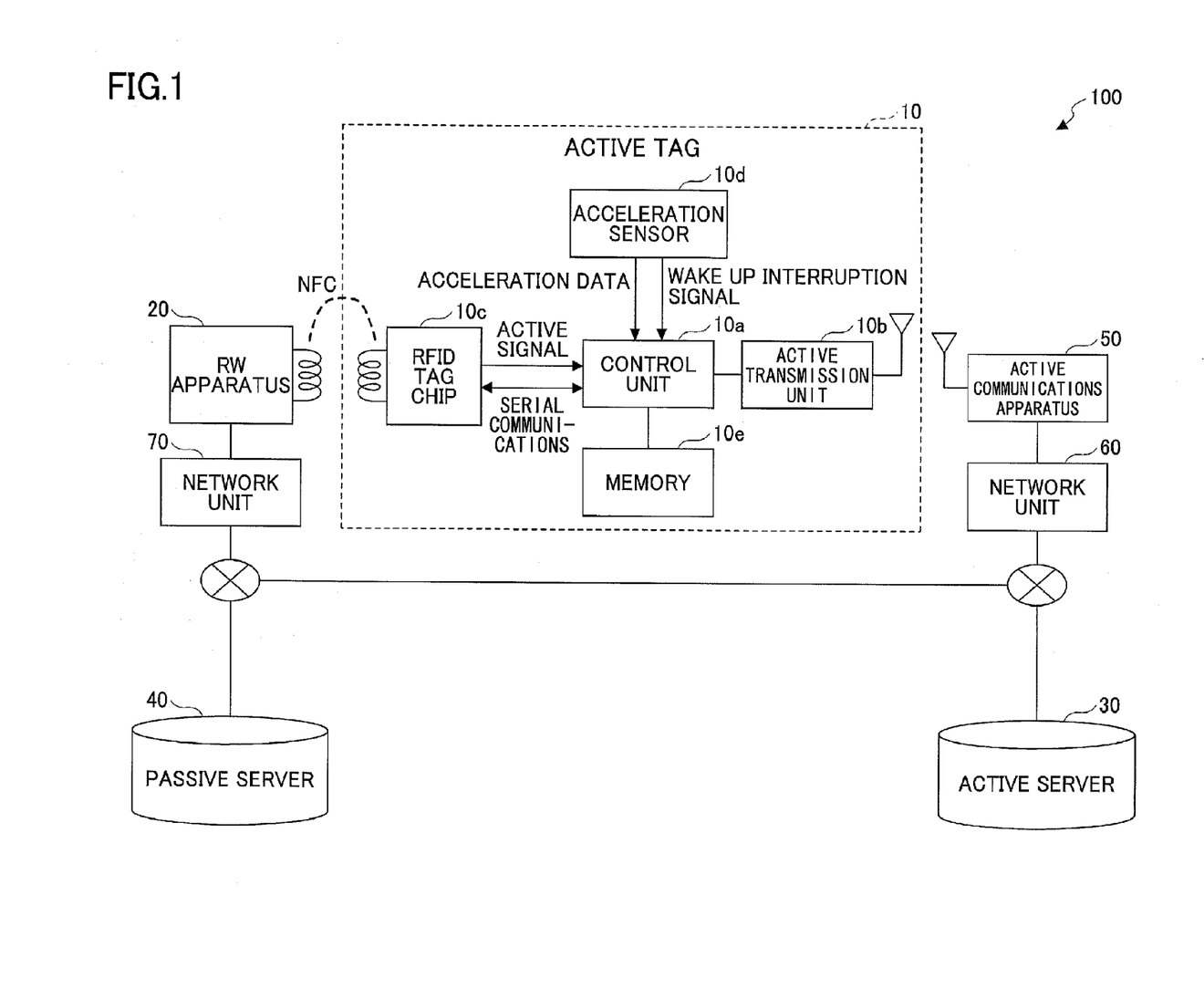
FIG. 1 is a block diagram illustrating one example of a general configuration of a communications system according to one embodiment of the present invention.

FIG. 1 illustrates a communications system 100 according to the present embodiment.

The communications system 100 is used for, for example, managing position information of a person within a building, and includes an active tag 10, a RW apparatus 20, an active server 30, a passive server 40, and an active communications apparatus 50.

The active tag 10 is carried by, for example, a user (person). The active tag 10 is an active IC (Integrated Circuit) tag (wireless tag). The active tag 10 transmits an encrypted ID while power is being supplied to the active tag 10 (described later with reference to FIG. 2).

The active tag 10 includes a control unit 10a, an active transmission unit 10b, an RFID (Radio Frequency Identification) tag chip 10c, an acceleration sensor 10d, and a memory 10e. The memory 10e stores, for example, an ID of a user who carries the active tag 10, an encryption key to encrypt the ID, and user information. The "encryption key" is not limited to an "execution key" which is used when encryption software is executed. The encryption key may be other information as long as the encryption key is used when carrying out an encryption process.

The control unit 10a reads the ID, the encryption key, and the user information stored in the memory 10e, encrypts the ID using the encryption key, and outputs the encrypted ID and the user information to the active transmission unit 10b. The memory 10e previously stores a default (in other words, an initial setting of) encryption key.

The control unit 10a receives acceleration data transmitted together with an interruption signal (in FIG. 1, a "WAKE UP INTERRUPTION SIGNAL") from the acceleration sensor 10d, and outputs the acceleration data to the active transmission unit 10b. The acceleration data indicates acceleration of the active tag 10 itself.

The active transmission unit 10b wirelessly transmits the encrypted ID and the acceleration data from the control unit 10a to the active communications apparatus 50.

The active communications apparatus 50 is connected with the active server 30 through communications via a network unit 60, and transmits the encrypted ID and the acceleration data that are transmitted from the active transmission unit 10b of the active tag 10 to the active server 30.

The active server 30 decrypts the encrypted ID transmitted from the active communications apparatus 50, and monitors (in other words, counts) the number of times of movements of the active tag 10 (in other words, the number of times of movements of a person who carries the active tag 10) based on the acceleration data transmitted from the active communications apparatus 50. In other words, the active server 30 manages a location of the person. In the monitoring the number of times of movements, "one time" is counted from when the acceleration of the active tag 10 rises from 0 until the acceleration of the active tag 10 returns to 0 again, for example.

The RFID tag chip 10c is, for example, a passive RFID tag chip capable of carrying out Near Field Communication with the RW apparatus 20. The RFID tag chip 10c has a memory (for example, EEPROM (Electrically Erasable Programmable Read-Only Memory)) in which data is writeable through radio waves. Part of the data written through radio waves is the encryption key (in other words, key information) used to encrypt the ID.

The RW apparatus 20 is installed on, for example, a door of a gateway or a side of the gateway (for example, a wall) of a room secured strictly in a building. The door is locked when the security is turned on, and is unlocked when the security is turned off. When the active tag 10 is put over the RW apparatus 20, and the RFID tag chip 10c and the RW apparatus 20 are then connected through communications, the RFID tag chip 10c transmits the encrypted ID to the RW apparatus 20. As a result, authentication using the ID is carried out. If the authentication is successful, the security is cancelled into a turned off state, and the door is unlocked.

The active communications apparatus 50 may be installed on, for example, a door of a gateway or a side of the gateway (for example, a wall) of a room not strictly secured in a building. In this case, when the active tag 10 and the active server 30 are connected through communications via the active communications apparatus 50 and the network unit 60, the security may be canceled into a turned off state, and the door may be unlocked. In this case, the user need not put the active tag 10 over the active communications apparatus 50 for unlocking the door. Thus, entering and exiting the room can be carried out smoothly.

The RW apparatus 20 is connected with the passive server 40 through communications via a network unit 70. The RW apparatus 20 reads the encrypted ID from the RFID tag chip 10c, and transmits the read encrypted ID, and an authentication request using the ID, to the passive server 40.

The passive server 40 carries out an authentication operation using the encrypted ID according to the encrypted ID and the authentication request using the ID transmitted from the RW apparatus 20. If the authentication is successful, the passive server cancels (in other words, turns off) the security, and unlocks the door. In other words, the passive server 40 manages entering and exiting the room of a person. When the passive server 40 is connected with the active server 30 through communications, and carries out authentication using the encrypted ID, the passive server 40 carries out the authentication using the ID decrypted by the active server 30. In this case, for example, the passive server 40 compares the encrypted ID transmitted from the RW apparatus 20, with the ID before being decrypted by the active server 30. If the comparison result is that the encrypted IDs agree with one another, the passive server 40 determines that the decrypted ID is the encrypted ID transmitted from the RW apparatus 20. Then, the decrypted ID is used to carry out the authentication.

Generally speaking, active tags are used for identifying a position of a person, access control, and security. Active tags include active tags (hereinafter, simply referred to as "uni-directional communications active tags") that carry out uni-directional communications to transmit radio waves uni-directly, and active tags (hereinafter, simply referred to as "bi-directional communications active tags") that carry out bi-directional communications. Generally speaking, bi-directional communications active tags have advanced communications procedures, and have complicated encryption systems to prepare for interception. Uni-directional communications active tags encrypt IDs to be stored using an encryption key. However, there is a likelihood that a relation between an ID and a person or an object which has an active tag with the person or the object is identified. In other words, there may be a likelihood that, as a result of an ID transmitted through communications in a form of radio waves and a person or an object which has an active tag with the person or the object being observed, and being associated together, a relation between the ID and the person or the object is identified.

Therefore, according to the embodiment, if an encryption key is to be switched, the active server 30 generates a new encryption key, and sets an encryption key switching request flag (which will be described later with reference to FIG. 3).

When the active server 30 has set the encryption key switching request flag (in step S15 of FIG. 3), the passive server 40 acquires the new encryption key from the active server 30 (in step S25 of FIG. 4 described later), and transmits the new encryption key to the RW apparatus 20 (in step S26).

When the RW apparatus 20 has been connected to the active tag 10 through communications, the RW apparatus 20 transmits the new encryption key transmitted from the passive server 40 to the active tag 10 (in step S33 of FIG. 5 described later).

The above-mentioned operations of the active tag 10 will be described in detail with reference to a flowchart of FIG. 2. The active tag 10 starts a sequence of operations illustrated in FIG. 2 when a battery has been set in the active tag 10. Alternatively, if the active tag 10 has a power switch, the active tag 10 starts the sequence of operations illustrated in FIG. 2 when the power switch has been turned on.

First, in step S1, the active tag 10 sets "1" in a variable "n".

Next, in step S2, the active tag 10 encrypts the ID using an nth encryption key stored in the memory 10e (i.e., a first encryption key that is a default encryption key).

Next, in step S3, the active tag 10 transmits the ID encrypted using the nth encryption key in step S2 via the active communications apparatus 50 to the active server 30.

Next, in step S4, the active tag 10 determines whether the active tag 10 has received an (n+1)th encryption key, in other words, whether the RW apparatus 20 has written the (n+1)th encryption key in the active tag 10 (in step S33 of FIG. 5 described later). If the determination result in step S4 is affirmative ("YES"), the active tag 10 carries out step S5. If the determination result in step S4 is negative ("NO"), the active tag 10 again carries out step S4. In other words, the active tag 10 carries out the determination again.

In step S5, the active tag 10 increments the variable "n" by "1". After carrying out step S5, the active tag 10 returns to step S2.

Thus, when the active tag 10 has received an (n+1)th encryption key (YES in step S4), the active tag 10 encrypts the ID using the received the (n+1)th encryption key instead of the original encryption key, i.e., the nth encryption key, and transmits the encrypted ID to the active server 30 (in steps S2-S3). Note that it is desirable that the active tag 10 stores the nth encryption key in the memory 10e as history information even after receiving the (n+1)th encryption key. It is desirable to leave the history information undeleted for at least three or four times of carrying out step S5.

By thus leaving the history of encryption keys, it is possible to confirm, at any time by reading the history, when an encryption key was rewritten if a malicious third person has rewritten the encryption key.

Note that it is desirable that communications between the active tag 10 and the RW apparatus 20 is protected through encryption such as AES (Advanced Encryption Standard), or using a password, for example. In other words, it is desirable to effectively prevent a malicious third person from easily rewriting or reading the ID using communications between the active tag 10 and the RW apparatus 20.

Next, operations of the active server 30 will be described with reference to a flowchart of FIG. 3. The active server 30 starts a sequence of operations illustrated in FIG. 3 when the active server 30 has received the ID that has been encrypted using the nth encryption key and transmitted from the active transmission unit 10b of the active tag 10 through the active communications apparatus 50 (in step S3 of FIG. 2).

First, in step S11, the active server 30 decrypts the encrypted ID using an nth encryption key transmitted from the active tag 10. Note that the nth encryption key is the same as an (n+1)th encryption key that has been generated by itself in step S14 that will be described later, has been acquired by the passive server 40, has been transmitted to the RW apparatus 20 (in steps S25-S26, described later), and has been written in the active tag 10 by the RW apparatus 20 (in step S33 of FIG. 5, described later). Note that, as a result of the variable "n" being incremented by 1 in step S5 of FIG. 2, the name of "(n+1)th encryption key" has been changed to "nth encryption key". Therefore, the active server 30 knows the nth encryption key, and, as mentioned above, can decrypt the encrypted ID using the nth encryption key.

Next, in step S12, the active server 30 determines whether a predetermined period of time (for example, 30 minutes, 1 hour, or 2 hours) has elapsed from a start of using the nth encryption key. The active server 30 implements the operation with time using, for example, a timer included in the active server 30. If the determination result in step S12 is affirmative ("YES"), the active server 30 carries out step S14. If the determination result in step S12 is negative ("NO"), the active server 30 carries out step S13.

In step S13, the active server 30 determines the number of times of movements of the active tag 10, in other words, determines whether the number of times of movements of a user who has the active tag 10 with him or her is higher than or equal to a predetermined number of times (for example, 100 times, 200 times, or 300 times). If the determination result in step S13 is affirmative ("YES"), the active server 30 carries out step S14. If the determination result in step S13 is negative ("NO"), the active server 30 ends the operation of the flow.

In step S14, the active server 30 generates the (n+1)th encryption key. Note that the (n+1)th encryption key is an encryption key different from (other than) the nth encryption key.

Next, in step S15, the active server 30 sets the encryption key switching request flag. After carrying out step S15, the active server 30 ends the operation of the flow.

Thus, when the active server 30 has received the encrypted ID from the active tag 10 via the active communications apparatus 50, the active server 30 newly generates the encryption key, and sets an encryption key switching request flag, if an encryption key is to be switched (in other words, YES in step S12 or YES in step S13).

Note that it is desirable that a timing of setting the encryption key switching request flag after the active server 30 generates the (n+1)th encryption key (in other words, a period of time to wait for setting the encryption key switching request flag after generation of the (n+1)th encryption key) can be freely determined by the user depending on the desired security level. In other words, it is desirable to store, for each ID, thresholds of parameters concerning switching an encryption key such as a time at which an encryption key was previously switched, the number of times of accessing the RW apparatus 20 by the active tag 10, and the number of times of movements of the active tag 10, in the active server 30, and it is desirable that the thresholds can be freely determined.

Further, in order to avoid impersonation by a third person, the following configuration may be included. That is, it is possible to query the active server as to whether there is a record (an evidence) indicating that the active tag 10 has accessed another RW apparatus different from the RW apparatus 20 after accessing (in other words, being put over) the RW apparatus 20.

If further enhancement of security is desired, such a setting may be made that, if there is a record indicating that the active tag 10 has accessed another RW apparatus different from the RW apparatus 20 after accessing the RW apparatus 20, the RW apparatus 20 forcibly switches an encryption key. Forcible switching an encryption key in this case may be implemented as a result of a smartphone, for example, instead of the RW apparatus 20, being used to access the active server 30 and the passive server 40.

Next, operations of the passive server 40 will be described with reference to a flowchart of FIG. 4. When the passive server 40 has received an authentication request (in step S31 of FIG. 5, described later) by the active tag 10 from the RW apparatus 20, the passive server 40 starts a sequence of operations illustrated in FIG. 4.

Figure 4:
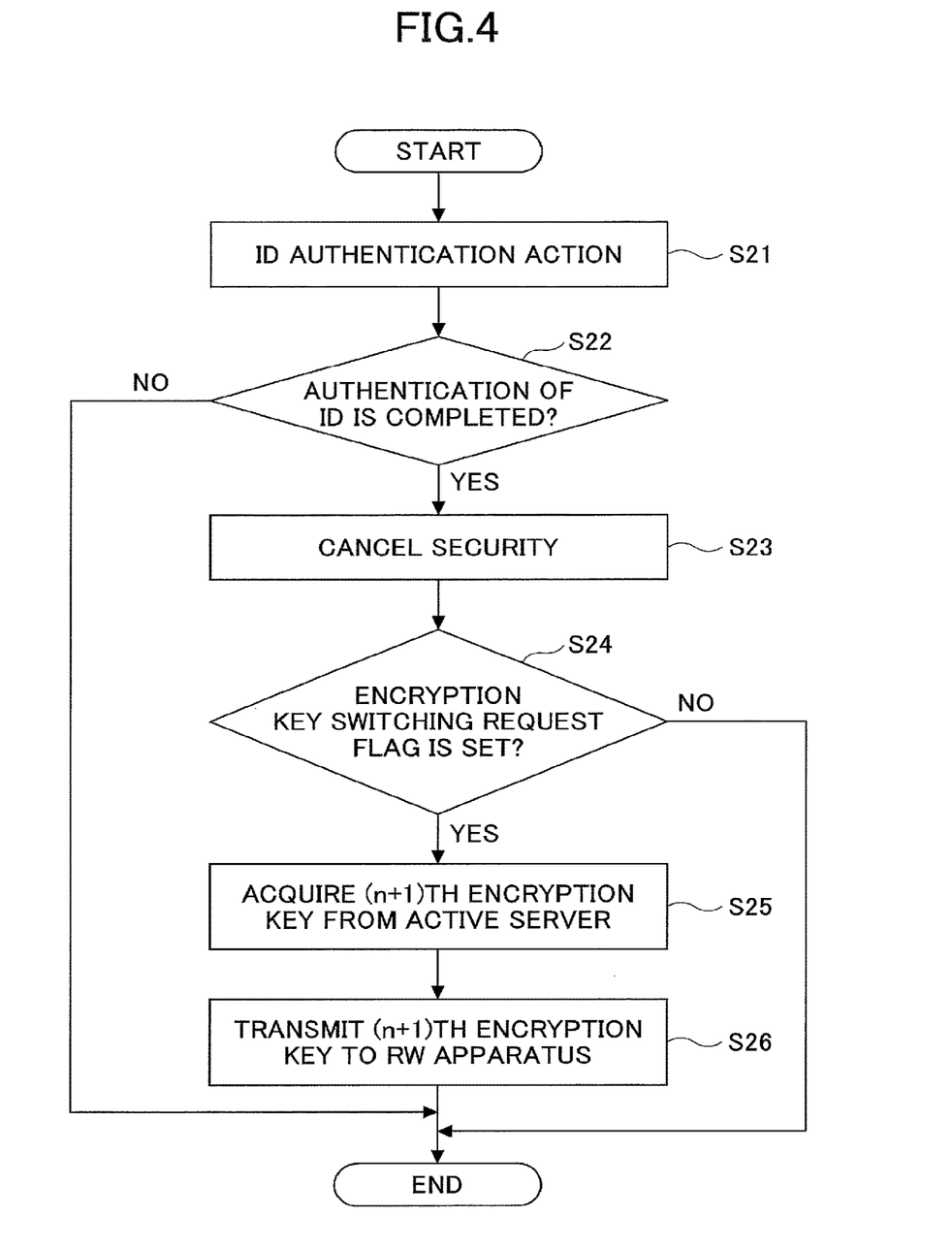
FIG. 4 is a flowchart illustrating one example of operations of a passive server illustrated in FIG. 1.

First, in step S21, the passive server 40 carries out an authentication operation using an ID (referred to as an "ID authentication operation" in FIG. 4). Actually, the passive server 40 reads the ID decrypted by the active server 30, compares the ID with a registered ID for which entering the room is permitted, and determines that the authentication is successful if the two IDs agree with one another.

Next, in step S22, the passive server 40 determines whether the authentication using the ID is successful. If the determination result in step S22 is affirmative ("YES"), the passive server 40 carries out step S23. If the determination result in step S22 is negative ("NO"), the passive server 40 ends the operation of the flow.

In step S23, the passive server 40 cancels (turns off) the security, in other words, unlocks the door of the room, for example. Note that if the unlocked door is again closed, the security is again turned on, and the door is locked.

Next, in step S24, the passive server 40 determines whether the encryption key switching request flag is set. In other words, the passive server 40 determines whether the encryption key switching request flag is set in the active server 30 (in step S15 in FIG. 3). If the determination result in step S24 is affirmative ("YES"), the passive server 40 carries out step S25. If the determination result in step S24 is negative ("NO"), the passive server 40 ends the operation of the flow.

In step S25, the passive server 40 acquires the (n+1)th encryption key (generated in step S14 of FIG. 3) from the active server 30.

In step S26, the passive server 40 transmits the (n+1)th encryption key acquired in step S25 to the RW apparatus 20. After carrying out step S26, the passive server 40 ends the operation of the flow.

As can be seen from the above description, the passive server 40 carries out authentication using the ID of the active tag 10 (in step S21 in FIG. 4), and transfers the (n+1)th encryption key acquired from the active server 30 to the RW apparatus 20 (in steps S25-S26).

Next, operations of the RW apparatus 20 will be described with reference to a flowchart of FIG. 5. The RW apparatus 20 starts a sequence of operations illustrated in FIG. 5 when the RW apparatus 20 has received the encrypted ID transmitted from the active tag 10 as a result of the active tag 10 being put over the RW apparatus 20. Note that receiving the encrypted ID transmitted by the active tag 10 by the RW apparatus 20 also means reading the encrypted ID from the active tag 10 by the RW apparatus 20.

First, in step S31, the RW apparatus 20 transmits the authentication request using the ID to the passive server 40. The authentication request using the ID means a request to carry out an authentication operation using the encrypted ID that is transmitted (read) from the active tag 10.

Next, in step S32, the RW apparatus 20 determines whether the RW apparatus 20 has received the (n+1)th encryption key (transmitted from the passive server 40 in steps S26 of FIG. 4). If the determination result in step S32 is affirmative ("YES"), the RW apparatus 20 carries out step S33. If the determination result in step S32 is negative ("NO"), the RW apparatus 20 ends the operation of the flow.

In step S33, the RW apparatus 20 writes the (n+1)th encryption key received in step S32 in the memory 10e of the active tag 10. The RW apparatus 20 ends the operation of the flow after carrying out step S33.

Thus, the RW apparatus 20 reads the encrypted ID from the active tag 10 when the active tag 10 is put over the RW apparatus 20, and inquires of the passive server 40 about the read ID (step S31). If the encryption key is to be switched (YES in step S12, or YES in step S13 of FIG. 2), the active server 30 generates a new encryption key (a switched key) (in step S14 of FIG. 2). The generated new encryption key (the switched key) is transmitted to the RFID tag chip 10c via the passive server 40 and the RW apparatus 20 (steps S25-S26 of FIG. 4→YES in step S32 of FIG. 5→step S33). The new encryption key (the switched key) is written in the memory 10e by the RFID tag chip 10c using a signal ("ACTIVE SIGNAL" in FIG. 1) (via the control unit 10a) (in step S33).

The control unit 10a knows from a flag of the memory that the new encryption key is written in the memory 10e by the RFID tag chip 10c. When the new encryption key is written (YES in step S4 of FIG. 2), the control unit 10a uses the new encryption key to encrypt the ID (in step S2 of FIG. 2). Thus, the respective signals transmitted in a form of radio waves from the RFID tag chip 10c and the active transmission unit 10b of the active tag 10 change although the signals indicate the same ID. Therefore, even if the radio waves are intercepted, and a person who has the active tag 10 with him or her is temporarily identified by a malicious third person, it is not possible for the third person to follow up the location of the person for a long time by continuously intercepting the radio waves. In other words, even if the third person intercepts the signal that indicates the encrypted ID, and associates the signal with the person who has the active tag 10 with him or her temporarily, the third person is prevented from identifying that the changed signal corresponds to the person, because the signal is thereafter changed as mentioned above. Note that the control unit 10a and the RFID tag chip 10c are connected via, for example, serial communications.

The active tag 10 according to the embodiment described above is the IC tag (the wireless tag) as an identification information transmitter and encrypts an ID (i.e., identification information for identifying a person) using an encryption key, and transmits the encrypted ID. The active tag 10 is capable of receiving another encryption key (an (n+1)th encryption key) different from one encryption key (an nth encryption key) that is currently being used to encrypt an ID. When the active tag 10 has received the other encryption key, the active tag 10 switches an encryption key to be used to encrypt an ID from the original one encryption key to the other encryption key.

Thus, the active tag 10 according to the embodiment of the present invention can switch an encryption key to be used to encrypt an ID. Therefore, even if an encrypted ID is intercepted by a third person, and a location of a person who has the active tag 10 with him or her is identified, it is possible to shorten a time during which the location of the person is identified.

As a result, it is possible to prevent a location of a person who has the active tag 10 with him or her from being continuously identified. As a result, it is possible to prevent a location of a person who has the active tag 10 with him or her from being followed up, and it is possible to improve the security.

Figure 6:
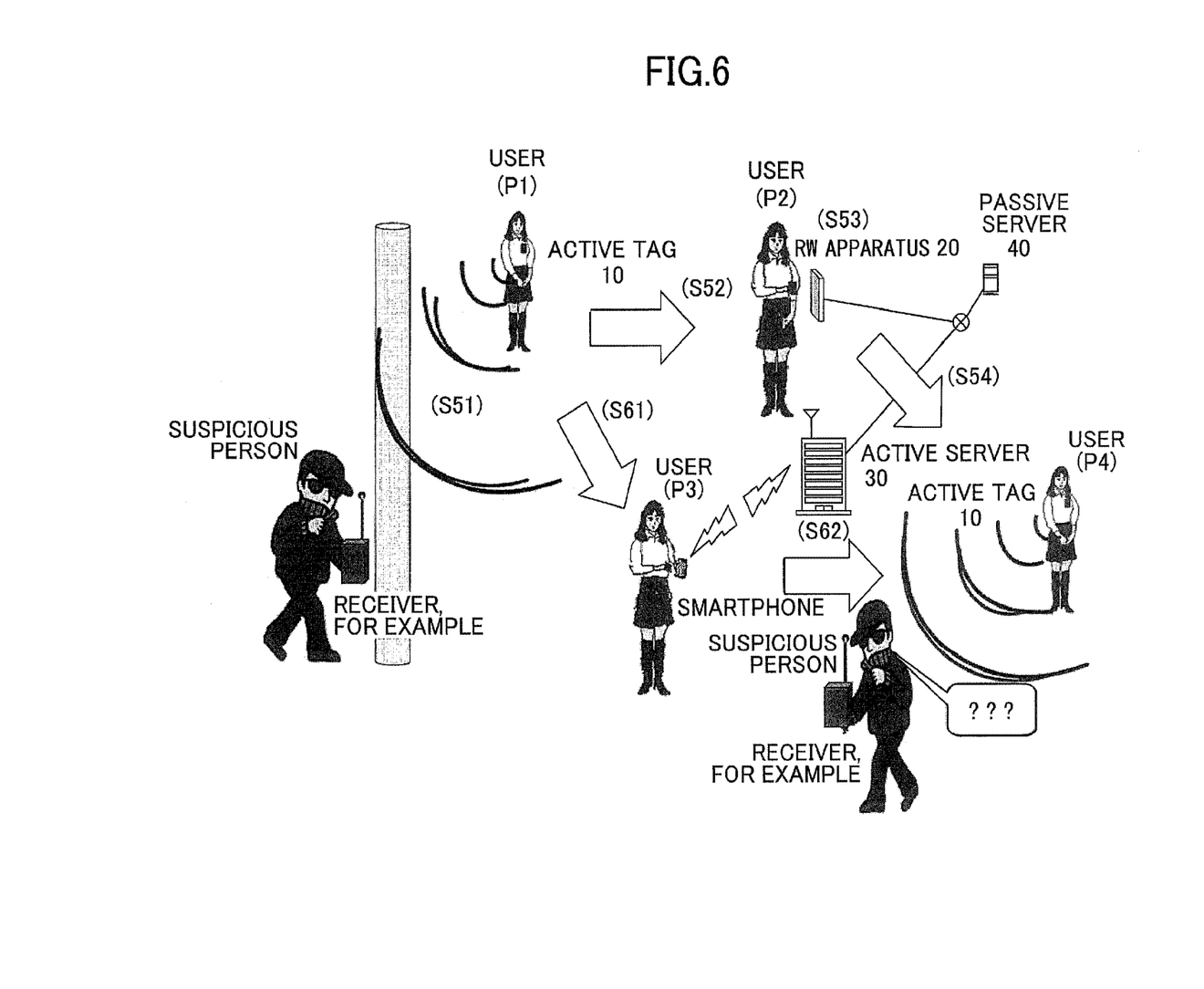
FIG. 6 illustrates one example of a method for using the active tag illustrated in FIG. 1.

Below, an example of a method for actually using the active tag 10 will be described. As illustrated in FIG. 6, if a suspicious person intercepts radio waves transmitted by the active tag 10 carried by a user who is at a position P1 (in step S51), the suspicious person (for example, a stalker) may identify the location of the user. If the location of the user is identified using the radio waves intercepted in step S51, the suspicious person can follow up the location of the user by selectively receiving the radio waves.

It is then assumed that the user moves, for example, to a position P2 from the position P1 for entering a secured building or room (in step S52). If the user then puts the active tag 10 over the RW apparatus 20 (in step S53), an encrypted key used by the active tag 10 is ultimately switched (step S31 of FIG. 5→steps S21-S26 of FIG. 4→steps S32-S33 of FIG. 5).

Figure 2:
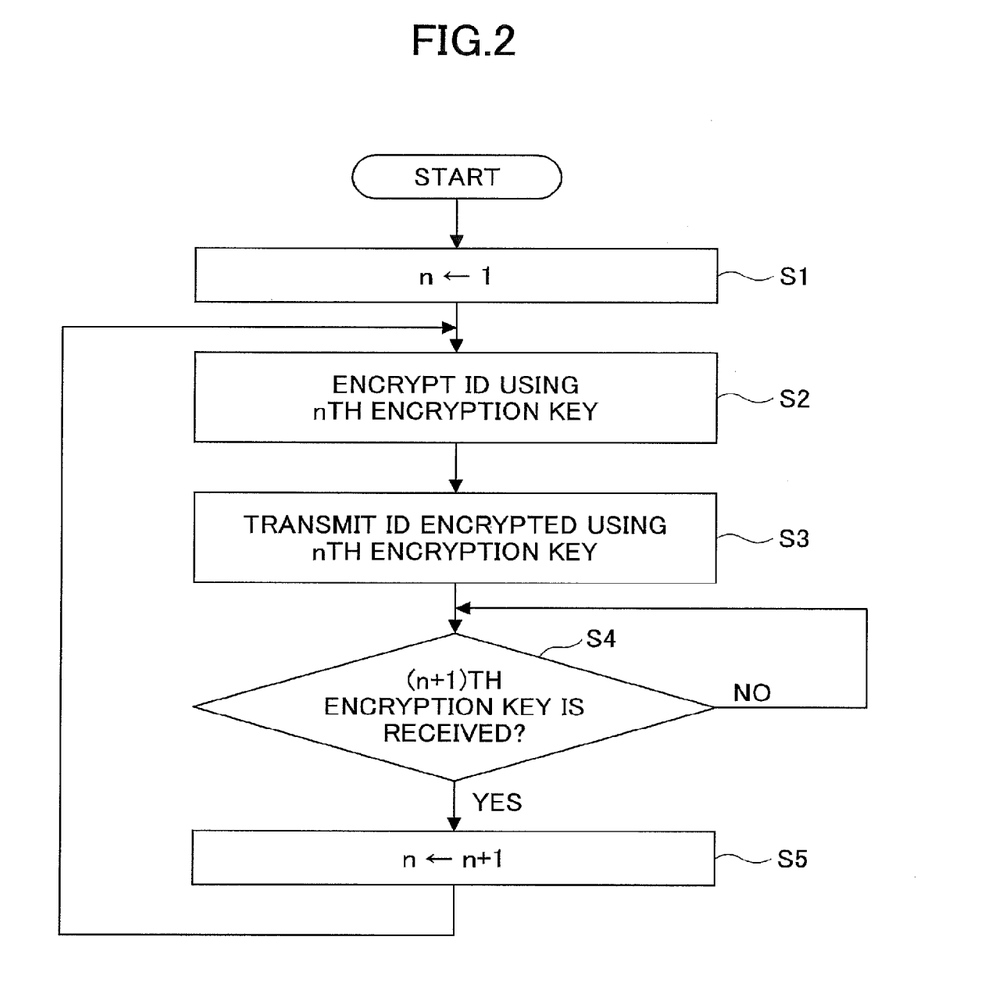
FIG. 2 is a flowchart illustrating one example of operations of an active tag illustrated in FIG. 1.

As a result, radio waves that are transmitted from the active tag 10 carried by the user who has entered the building or room from the position P2 (in step S54) are different from the radio waves intercepted in step S51 (YES in step S4 of FIG. 2→steps S2-S3). As a result, the suspicious person becomes not be able to identify the location (a position P4, for example) of the user, using the radio waves by which the suspicious person has once identified the location of the user as mentioned above.

In another case, it is assumed that the user whose location is identified by the suspicious person as a result of the radio waves being intercepted at the position P1 as mentioned above (in step S51) moves, for example, to a position P3 (in step S61), and starts an "encryption key switching application" installed in a smartphone carried by the user. As a result, the encryption key used by the active tag 10 is switched, and thereafter, the suspicious person becomes not be able to identify the location (for example, the position P4) of the user who has moved (in step S62).

Further, the active tag 10 is capable of receiving a transmitted encryption key (in step S4 of FIG. 2). As a result, the active tag 10 is capable of acquiring a new encryption key at any time. Therefore, the active tag 10 need not previously store an encryption key, and the active tag 10 may be not capable of storing an encryption key. As a result, in comparison to a case where the active tag 10 stores a plurality of encryption keys, and updates an encryption key to be used to encrypt an ID by selecting an encrypting key from the encryption keys in a time-series manner, it is possible to simplify the configuration and control of the active tag 10.

Also, the active tag 10 is capable of storing a plurality of encryption keys. Therefore, already used encryption keys may be left as history information in the active tag 10.

The communications system 100 of FIG. 1 includes the active tag 10, and the RW apparatus 20 which is capable of transmitting an encryption key to the active tag 10 (in step S33 of FIG. 5) when the RW apparatus 20 and the active tag 10 are connected through communications. As a result, it is possible to improve the security level of the system.

The RW apparatus 20 transmits another encryption key to the active tag 10 (step S33), when the RW apparatus 20 has received the other encryption key (the (n+1)th encryption key) (YES in step S32 of FIG. 5), in other words, when an encryption key is to be switched. As a result, unnecessary switching of an encryption key can be avoided, and it is possible to reduce the load of the system.

Also, the active server 30 generates another encryption key (an (n+1)th encryption key) (in step S14 of FIG. 3) when an elapsed time measured from a start of using a most recently used encryption key (an nth encryption key) is longer than or equal to a predetermined period of time (for example, 30 minutes, one hour or 2 hours) (YES in step S12). The generated other encryption key (the (n+1)th encryption key) is transmitted to the RW apparatus 20 via the passive server 40 (steps S25-S26 of FIG. 26). When the RW apparatus 20 has received the other encryption key (the (n+1)th encryption key), the RW apparatus 20 transmits the other encryption key to the active tag 10 (YES in step S32 of FIG. 5→step S33). Thus, if an elapsed time from a start of using a most recently used encryption key (an nth encryption key) is longer than or equal to a predetermined period of time (for example, 30 minutes, 1 hour, or 2 hours), another encryption key (an (n+1)th encryption key) is transmitted to the active tag 10 (step S33 of FIG. 5) The active tag 10 receives the other encryption key (the (n+1)th encryption key) (YES in step S4 of FIG. 2), encrypts an ID using the other encryption key, and transmits the encrypted ID (in steps S2-S3). Therefore, a signal by which the same ID is transmitted is changed. As a result, even if a location of a person who has the active tag 10 with him or her is identified by a third person, the third person becomes not be able to identify the location of the person who has the active tag 10 with him or her because of the change of the signal. As a result, it is possible to reduce a period of time during which a location of a person who has the active tag 10 with him or her is identified to be less than the predetermined period of time.

Figure 3:
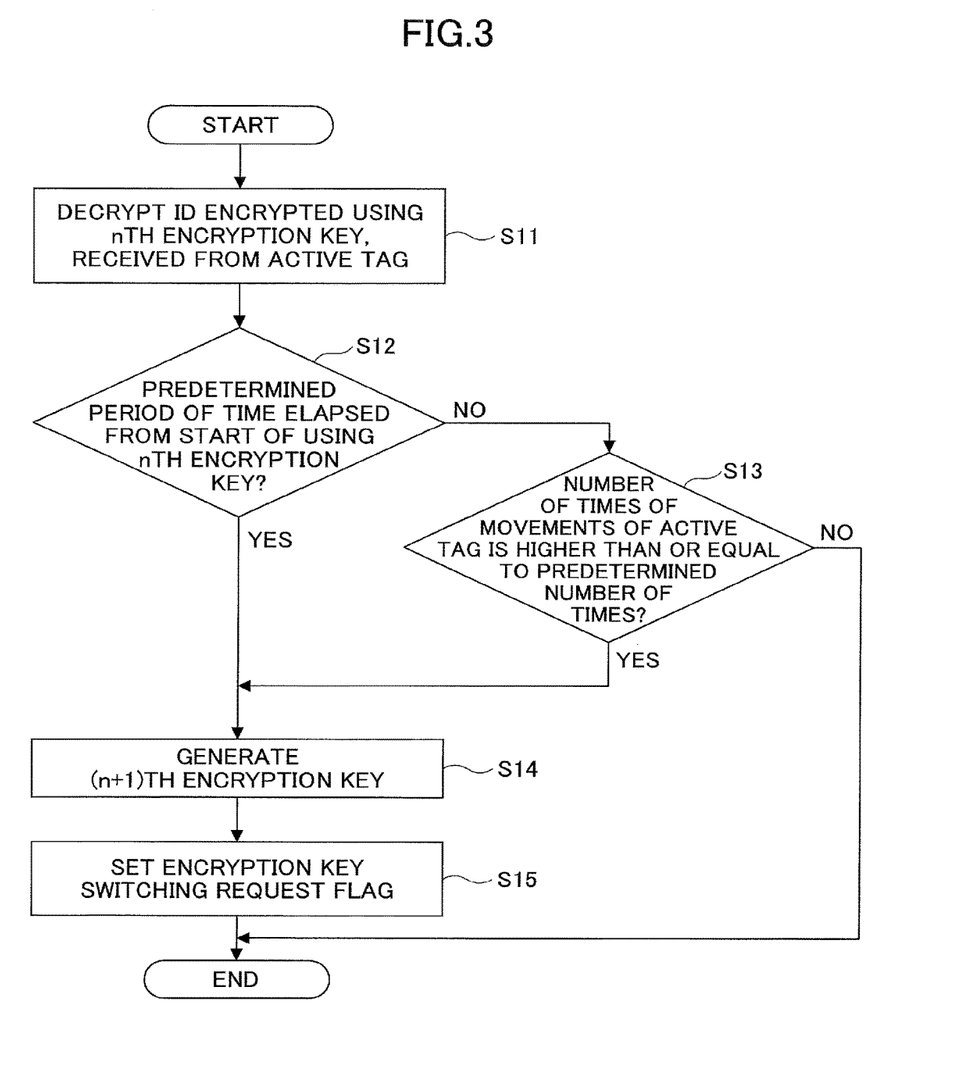
FIG. 3 is a flowchart illustrating one example of operations of an active server illustrated in FIG. 1.

The active server 30 generates another encryption key (an (n+1)th encryption key) (step S14) when the number of times of movements of the active tag 10 is higher than or equal to a predetermined number of times (for example, 100 times) (YES in step S13 of FIG. 3). The generated other encryption key (the (n+1)th encryption key) is transmitted to the RW apparatus 20 via the passive server 40 (step S25→step S26 of FIG. 26). When the RW apparatus 20 has received the other encryption key (the (n+1)th encryption key), the RW apparatus 20 transmits the other encryption key to the active tag 10 (YES in step S32 of FIG. 5→step S33). Thus, if the number of times of movements of the active tag 10 is higher than or equal to the predetermined number of times (for example, 100 times), another encryption key (an (n+1)th encryption key) is transmitted to the active tag 10 (step S33 of FIG. 5). The active tag 10 receives the other encryption key (the (n+1)th encryption key) (YES in step S4 of FIG. 2), encrypts an ID using the other encryption key, and transmits the encrypted ID (in steps S2-S3). Therefore, the signal by which the same ID is transmitted is changed. As a result, even if a location of a person who has the active tag 10 with him or her is identified by a third person, the third person becomes not be able to identify the location of the person who has the active tag 10 with him or her because of the change in the signal. As a result, it is possible to reduce occasions on which a location of a person who has the active tag 10 with him or her is identified.

Figure 5:
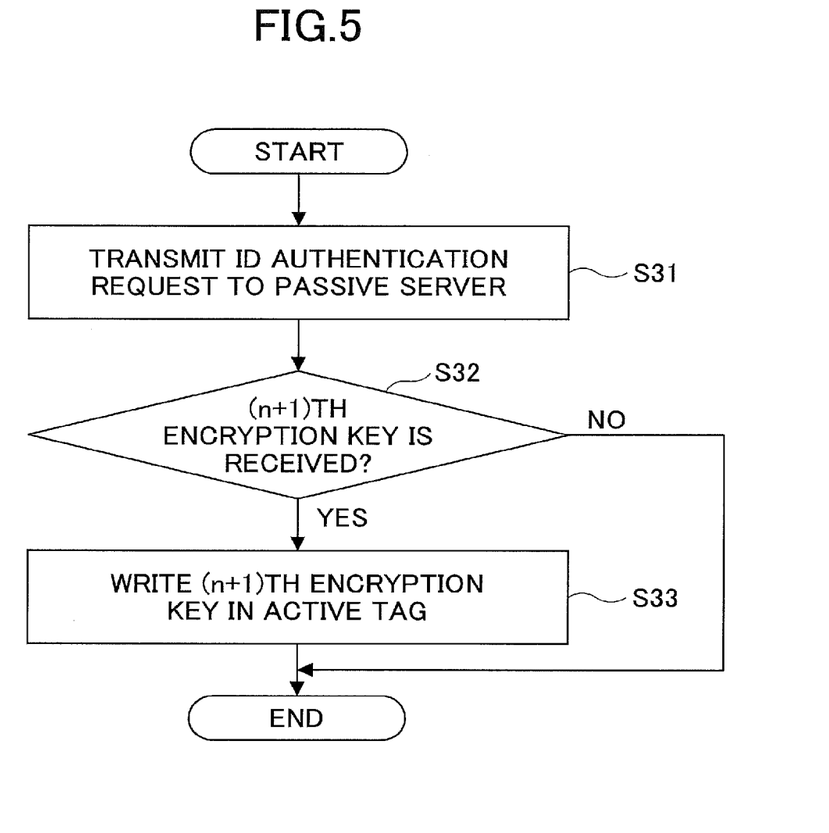
FIG. 5 is a flowchart illustrating one example of operations of a RW (Reader Writer) apparatus illustrated in FIG. 1.

Further, when the RW apparatus 20 and the active tag 10 are connected through communications as a result of the active tag 10 being put over the RW apparatus 20, the RW apparatus 20 then receives an encrypted ID transmitted from the active tag 10, and transmits an authentication request using the ID ("ID AUTHENTICATION REQUEST" in FIG. 5) to the passive server 40 (step S31 of FIG. 5). Thus, the passive server 40 can authenticate the encrypted ID (in step S21 of FIG. 4).

As can be seen from the above description, in response to an action of a user, i.e., putting the active tag 10 over the RW apparatus for access authentication, for example, an update of an encryption key can be implemented (in steps S31-S33 of FIG. 5). Therefore, it is possible to reduce the work in the operation of the system. Further, by setting a point (in other words, installing the RW apparatus 20) to switch an encryption key at an appropriate place, it is possible to remarkably reduce the risk that an ID of a person is identified as a result of radio waves being intercepted (in other words, reduce a period of time during which or occasions on which an ID of a person is identified).

In other words, if the active tag 10 is put over the RW apparatus 20 which is a reader writer for the passive RFID tag chip 10c for Near Field Communication, the RW apparatus 20 is connected to the passive server 40 via a network (in step S31 of FIG. 5). Then, as the occasion arises, an encryption key is written in the memory 10e of the active tag 10 (YES in step S32→step S33). Then, the written encryption key is acquired by the control unit 10a from the memory 10e, and the acquired encryption key is used to encrypt an ID to be transmitted (in steps S2-S3 of FIG. 2). As a result, a signal that is transmitted as radio waves changes in a certain period of time (YES in step S12 or S13 of FIG. 3→steps S14-S15→YES in step S24 of FIG. 4→→steps S25-S26→→steps S32-S33 of FIG. 5→YES in step S4 of FIG. 2→steps S2-S3). Therefore, it becomes very difficult to identify an ID of a person by intercepting the radio waves, identify a location of the person, and follow up the location of the person, and thus, it is possible to improve the security.

Note that in the above-mentioned embodiment, a case where an encryption key is to be switched is a case where an elapsed time from a start of using the most recently used encryption key (the nth encryption key) is longer than or equal to a predetermined period of time (YES in step S12 of FIG. 3), and a case where the number of times of movements of the active tag 10 is higher than or equal to a predetermined number of times (YES in step S13 of FIG. 3). However, an embodiment is not limited to these cases. A case where an encryption key is to be switched may be determined based on the date, the place where the RW apparatus 20 is installed, the movement distance of the active tag 10 (the movement distance of the user), and the position of the active tag 10 (the position of the user), for example. The movement distance of the active tag 10 may be measured based on, for example, the sensitivity (for example, the attenuation factor) of radio waves between the active tag 10 and the active communications apparatus 50.

For example, if the number of times of communications between the active tag 10 and the RW apparatus 20 (i.e., the number of times of accessing, i.e., the number of times of putting the active tag 10 over the RW apparatus 20) is higher than or equal to a predetermined number of times (for example, 5 times, 10 times, or 15 times), it may be determined that an encryption key is to be switched, a new encryption key may be thus generated, and the new encryption key may be transmitted to the active tag 10.

Also, in the above-mentioned embodiment, when an encryption key has been switched, as the occasion arises (YES in step S12 or S13 of FIG. 3→steps S14-S15), and as a result, the active tag 10 has received an encryption key from the RW apparatus 20, the active tag 10 switches an encryption key (steps S24-S26 of FIG. 4→YES in step S32 of FIG. 5→→step S33→YES in step S4 of FIG. 2→step S5→steps S2-S3). However, an embodiment is not limited to this way.

Also, according to the above-mentioned embodiment, the active tag 10 previously stores a default encryption key. However, it may be that the active tag 10 does not previously store a default encryption key. In this case, from the beginning, the active tag 10 may encrypt an ID using an encryption key that the active tag 10 receives.

Further, in the above-mentioned embodiment, the RW apparatus 20 is used as an apparatus which carries out Near Field Communication with the active tag 10. However, in addition to or instead of the RW apparatus 20, a portable terminal such as a smartphone, a so-called "garake" (in other words, a Japanese unique cell phone before smartphones became wide spread), or a tablet, for example, may be used. In this case, even though the user does not go to a specific place (for example, a place where the RW apparatus is installed), it is possible to switch an encryption key used by the active tag 10, by having the active tag 10 and the portable terminal with him or her (i.e., carrying the active tag 10 and the portable terminal). In this case, the application in the portable terminal may have been already started, and an encryption key may be automatically switched by the application. Alternatively, the user may operate the portable terminal to manually switch an encryption key.

Also, in the above-mentioned embodiment, a person has the active tag 10 with him or her. However, an embodiment is not limited to this way. Instead, an object may have the active tag 10 with the object (in other words, an object may be equipped with the active tag 10). In this case, it is possible to prevent the object equipped with the active tag 10 from being continuously identified by a third person. Actually, for example, identification information for identifying a product or a commodity such as a serial number or a commodity code may be encrypted, and be transmitted to (in other words, be written in) the active tag 10. As a result, it is possible to prevent a location of a product or a commodity equipped with the active tag 10 from being followed up, and it is possible to improve the security.

Also, in the above-mentioned embodiment, the RW apparatus 20 is installed on a door of a room, or a side of a door (for example, on a wall). However, an the RW apparatus 20 may be installed on a gate of a building, for example.

Also, in the above-mentioned embodiment, the passive server 40 carries out authentication by reading an ID decrypted by the active server 30 when the passive server 40 authenticates the encrypted ID. However, instead of this way, the RW apparatus 20 may decrypt the encrypted ID that the RW apparatus 20 has read from the active tag 10 by itself, and authenticate the decrypted ID.

Also, in the above-mentioned embodiment, the passive server 40 determines whether the encryption key switching request flag is set in the active server 30 (in step S24 of FIG. 4). However, instead of this way, the active server 30 may transmit a request to the passive server 40 to switch an encryption key. In this case, in step S24 of FIG. 4, the passive server 40 determines whether the passive server 40 has received the switching request from the active server 30. Then, when the passive server 40 has received the switching request, the passive server 40 carries out step S25.

Also, in the above-mentioned embodiment, the active tag 10 is capable of storing a plurality of encryption keys. However, it is sufficient that the active tag 10 is capable of storing at least one encryption key. Also, as mentioned above, the active tag 10 need not be able to store an encryption key (i.e., may use an encryption key that the active tag 10 has received).

Also, in the above-mentioned embodiment, if an encryption key is to be switched (YES in step S12 or S13 of FIG. 3), an encryption key is transmitted to the active tag 10 (in step S33). However, an embodiment is not limited to this way. For example, the RW apparatus 20 or the portable terminal may transmit an encryption key to the active tag 10 to update an encryption key each time the active tag 10 carries out communications with the RW apparatus 20 or the portable terminal.

Further, a configuration of the active tag 10 in an embodiment of the present invention is not limited to the configuration described above for the above-mentioned embodiment, and may be changed as the occasion arises. For example, if the number of times of movements of the active tag 10 is not be considered, the acceleration sensor 10d need not to be included in the active tag 10.

One of steps S12 and S13 may be omitted in the flowchart of FIG. 3. If step S12 is omitted, step S13 may be carried out subsequent to step S11. If step S13 is omitted, the flow may be ended if the determination result in step S12 is negative.

In the active tag 10, instead of the active transmission unit 10b, a passive transmission unit (in other words, a passive IC tag) may be used.

Further, in the above-mentioned embodiment, a timing when the active tag 10 switches an encryption key to be used to encrypt an ID from an nth encryption key (one encryption key) to an (n+1)th encryption key (another encryption key) is a time when the active tag 10 has received the (n+1)th encryption key (YES in step S5 of FIG. 2). However, an embodiment is not limited to this way. It is sufficient that the timing is any timing after the active tag 10 receives the (n+1)th encryption key.

Also, in the above-mentioned embodiment, an encryption key and an encrypted ID are transmitted through radio communications using, for example, the active transmission unit 10b, and through Near Field Communication using, for example, the RFID tag chip 10c. However, an embodiment is not limited to this way. An encryption key and an encrypted ID may be transmitted through another communications route or another communications system. For example, the active tag 10 may be a wireless tag capable of carrying out communications using radio waves of a plurality of different frequencies. In this case, the active tag 10 can receive a new encryption key through communications using one of the plurality of different frequencies.

Further, for example, if the active communications apparatus 50 is installed on a door of a gateway or a side of the gateway (for example a wall) of a room not strictly secured in a building, the door may be opened and closed, and, also, as the occasion arises, the active server 30 may transmit an encryption key to the active tag 10 and switch an encryption key to be used to encrypt an ID, when the active tag 10 and the active server 30 have been connected through communications.

Also, concerning the above-mentioned embodiment, the method for carrying out communications using the IC tag (the wireless tag) has been described. However, an embodiment is not limited to this way. The present disclosure may be generally applied to communications methods that include a step of encrypting identification information for identifying a person or an object using one encryption key, and transmitting the encrypted ID, a step of receiving another encryption key different from the one encryption key, and a step of encrypting identification information using the received other encryption key, and transmitting the encrypted ID.

According to the above-mentioned embodiment, it is possible to prevent a location of a person who has identification information transmission apparatus with him or her and an object equipped with the identification information transmission apparatus from being continuously identified.

The active tag 10 is one example of an identification information transmitter. The RW apparatus 20 is one example of an identification information receiver. The control unit 10a is one example of an encryption unit. The RFID tag chip 10c is one example of a transmission unit. The active transmission unit 10b is also one example of the transmission unit. The active server 30 is one example of a first server. The passive server 40 is one example of a second server.

Thus, the communications system and the communications methods have been described in the embodiments. However, embodiments are not limited to the above-described embodiments, and various modifications and replacements may be made.

What is claimed is:

1. A communications system comprising:
  an identification information transmitter configured to encrypt identification information for identifying one of a person and an object using an encryption key, transmit the encrypted identification information, and, after receiving another encryption key, switch the encryption key from the encryption key to the other encryption key;
  a first server configured to receive the encrypted identification information from the identification information transmitter, determine whether the encryption key is to be switched, and, if the encryption key is to be switched, generate the other encryption key;
  a second server configured to authenticate the identification information that an identification information receiver receives from the identification information transmitter, and, if authentication is successful, acquire the other encryption key from the first server, and transmit the other encryption key to the identification information receiver; and
  the identification information receiver configured to, when receiving the other encryption key from the second server, transmit the other encryption key to the identification information transmitter.

2. The communications system according to claim 1, wherein the identification information receiver is further configured to, when the identification information receiver is connected with the identification information transmitter through communications, be able to transmit the other encryption key to the identification information transmitter.

3. The communications system according to claim 1, wherein the identification information receiver is further configured to, when the encryption key is to be switched, transmit the other encryption key to the identification information transmitter.

4. The communications system according to claim 2, wherein the identification information receiver is further configured to, when the encryption key is to be switched, transmit the other encryption key to the identification information transmitter.

5. The communications system according to claim 3, wherein the identification information receiver is further configured to, when a period of time from a start of using the encryption key is longer than or equal to a predetermined period of time, transmit the other encryption key to the identification information transmitter.

6. The communications system according to claim 4, wherein the identification information receiver is further configured to, when a period of time from a start of using the encryption key is longer than or equal to a predetermined period of time, transmit the other encryption key to the identification information transmitter.

7. The communications system according to claim 3, wherein the identification information receiver is further configured to, when the number of times of movements of the identification information transmitter is higher than or equal to a predetermined number of times, transmit the other encryption key to the identification information transmitter.

8. The communications system according to claim 4, wherein the identification information receiver is further configured to, when the number of times of movements of the identification information transmitter is higher than or equal to a predetermined number of times, transmit the other encryption key to the identification information transmitter.

9. The communications system according to claim 3, wherein the identification information receiver is further configured to, when the number of times of communications between the identification information transmitter and the identification information receiver is higher than or equal to a predetermined number of times, transmit the other encryption key to the identification information transmitter.

10. The communications system according to claim 4, wherein the identification information receiver is further configured to, when the number of times of communications between the identification information transmitter and the identification information receiver is higher than or equal to a predetermined number of times, transmit the other encryption key to the identification information transmitter.

11. The communications system according to claim 1, wherein the identification information receiver is further configured to, when the identification information receiver is connected with the identification information transmitter through communications, receive the encrypted identification information transmitted from the identification information transmitter.

12. The communications system according to claim 1, wherein the identification information receiver is installed at a predetermined location.

13. The communications system according to claim 1, wherein the identification information receiver is a portable terminal.

14. A communications method comprising:
  encrypting, by an identification information transmitter, identification information for identifying one of a person and an object using an encryption key, and transmitting, by the identification information transmitter, the encrypted identification information;
  receiving, by the identification information transmitter, another encryption key different from the encryption key;
  encrypting, by the identification information transmitter, the identification information using the received other encryption key, and transmitting, by the identification information transmitter, the encrypted identification information;

receiving, by a first server, the encrypted identification information from the identification information transmitter, determining whether the encryption key is to be switched, and, if the encryption key is to be switched, generating the other encryption key;

authenticating, by a second server, the identification information that an identification information receiver receives from the identification information transmitter, and, if authentication is successful, acquiring the other encryption key from the first server and transmitting the other encryption key to the identification information receiver; and when the identification information receiver receives the other encryption key from the second server, transmitting, by the identification information receiver, the other encryption key to the identification information transmitter.

* * * * *